United States Patent
Detwiler et al.

(10) Patent No.: US 6,866,197 B1
(45) Date of Patent: Mar. 15, 2005

(54) OPTICAL SCANNER HAVING ENHANCED ITEM SIDE COVERAGE

(75) Inventors: Paul O. Detwiler, Lawrenceville, GA (US); Steven W. Damron, Woodstock, GA (US); Yeming Gu, Suwanee, GA (US); Barry M. Mergenthaler, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/688,113

(22) Filed: Oct. 17, 2003

(51) Int. Cl.[7] ................................................. G06K 7/10
(52) U.S. Cl. .......................... 235/462.39; 235/462.36; 235/462.38; 235/462.43
(58) Field of Search ....................... 235/462.39, 462.36, 235/462.38, 462.43, 462.13

(56) References Cited

U.S. PATENT DOCUMENTS

| | | | | |
|---|---|---|---|---|
| 5,886,336 A | * | 3/1999 | Tang et al. ............ | 235/462.43 |
| 6,502,753 B2 | * | 1/2003 | Detwiler ................. | 235/462.4 |
| 6,568,598 B1 | * | 5/2003 | Bobba et al. .......... | 235/462.39 |
| 6,585,161 B1 | * | 7/2003 | Acosta .................... | 235/462.4 |
| 6,631,844 B1 | * | 10/2003 | Ohkawa et al. ........ | 235/462.38 |
| 6,631,845 B2 | * | 10/2003 | Barkan .................... | 235/462.4 |
| 6,758,402 B1 | * | 7/2004 | Check et al. .......... | 235/462.34 |

* cited by examiner

*Primary Examiner*—Daniel Stcyr
*Assistant Examiner*—Daniel A. Hess
(74) *Attorney, Agent, or Firm*—Paul W. Martin

(57) ABSTRACT

An optical scanner having enhanced item side coverage which scans all six sides of an item and an intermediate side. The optical scanner includes a scanner housing, a first optics assembly within the scanner housing including a horizontal aperture, and a second optics assembly including a second housing within the scanner housing including a substantially vertical aperture. The first and second optics assemblies are capable of scanning six sides of an item. At least one of the first and second optics assemblies additionally generates third scan lines for scanning an intermediate side of the item.

45 Claims, 8 Drawing Sheets

FIG. 7

| Line Set | Facets | Primary Mirror | Secondary Mirror | Item Surfaces |
|---|---|---|---|---|
| Right Rear Diagonal (RRD) lines 110, 112 | 2,4 | Right Rear Diagonal mirror 88 | Right Rear Diagonal mirror 96 | Bottom, Intermediate Bottom Customer |
| Right Front Vertical (RFV) lines 114, 116 | 2,4 | Right Front Vertical mirror 80 | Right Front Vertical mirror 92 | Bottom, Checker, Trailing |
| Right Front Picket (RFP) lines 118, 120 | 2,4 | Right Front Picket mirror 72 | None | Bottom, Checker |
| Left Front Picket (LFP) lines 122, 124 | 2,4 | Left Front Picket mirror 70 | None | Bottom, Checker |
| Left Front Vertical (LFV) lines 126, 128 | 2,4 | Left Front Vertical mirror 78 | Left Front Vertical mirror 90 | Bottom, Checker, Leading |
| Left Rear Diagonal (LRD) lines 130, 132 | 2,4 | Left Rear Diagonal mirror 86 | Left Rear Diagonal mirror 94 | Bottom, Intermediate Bottom Customer |
| Right Horizontal (RH) lines 134, 136 | 1,3 | Right Horizontal mirror 84 | Right Horizontal mirror 100 | Bottom, Trailing |
| Right Front Diagonal (RFD) lines 138, 140 | 1,3 | Right Front Diagonal mirror 104 | None | Bottom, Checker |
| Right Front Bottom Picket (RFBP) lines 142, 144 | 1,3 | Right Front Bottom Picket mirror 76 | None | Bottom, Checker |
| Left Front Bottom Picket (LFBP) lines 146, 148 | 1,3 | Left Front Bottom Picket mirror 74 | None | Bottom, Checker |
| Left Front Diagonal (LFD) lines 150, 152 | 1,3 | Left Front Diagonal mirror 102 | None | Bottom, Checker |
| Left Horizontal (LH) lines 154, 156 | 1,3 | Left Horizontal mirror 82 | Left Horizontal mirror 98 | Bottom, Leading |

FIG. 10

| Line Set | Facets | Primary Mirror | Secondary Mirror | Item Surfaces |
|---|---|---|---|---|
| Left Bottom Diagonal (LBD) lines 210, 212 | 2,4 | Left Bottom Diagonal mirror 160 | Left Bottom Diagonal mirror 192 | Customer, Intermediate Bottom Customer |
| Left Top Vertical (LTV) lines 214, 216 | 2,4 | Left Top Vertical mirror 164 | Left Top Vertical mirror 196 | Customer, Top, Leading |
| Left Top Picket (LTP) lines 218, 220 | 2,4 | Left Top Picket mirror 168 | None | Customer, Top |
| Left Center Top Picket (LCTP) lines 222, 224 | 2,4 | Left Center Top Picket mirror 172 | None | Customer, Top |
| Right Center Top Picket (RCTP) lines 226, 228 | 2,4 | Right Center Top Picket mirror 174 | None | Customer, Top |
| Right Top Picket (RTP) lines 230, 232 | 2,4 | Right Top Picket mirror 170 | None | Customer, Top |
| Right Top Vertical (RTV) lines 234, 236 | 2,4 | Right Top Vertical mirror 166 | Right Top Vertical mirror 198 | Customer, Top, Trailing |
| Right Bottom Diagonal (RBD) lines 238, 240 | 2,4 | Right Bottom Diagonal mirror 162 | Right Bottom Diagonal mirror 194 | Customer, Intermediate Bottom Customer |
| Left Vertical (LV) lines 242, 244 | 1,3 | Left Vertical mirror 176 | Left Vertical mirror 200 | Customer, Leading |
| Left Diagonal (LD) lines 246, 248 | 1,3 | Left Diagonal mirror 180 | None | Customer |
| Left Top Diagonal (LTD) lines 250, 252 | 1,3 | Left Top Diagonal mirror 184 | None | Customer, Top |
| Left Center Top Diagonal (LCTD) lines 254, 256 | 1,3 | Left Center Top Diagonal mirror 188 | None | Customer, Top |
| Right Center Top Diagonal (RCTD) lines 258, 260 | 1,3 | Right Center Top Diagonal mirror 190 | None | Customer, Top |
| Right Top Diagonal (RTD) lines 262, 264 | 1,3 | Right Top Diagonal mirror 186 | None | Customer, Top |
| Right Diagonal (RD) lines 266, 268 | 1,3 | Right Diagonal mirror 182 | None | Customer |
| Right Vertical (RV) lines 270, 272 | 1,3 | Right Vertical mirror 178 | Right Vertical mirror 202 | Customer, Trailing |

OPTICAL SCANNER HAVING ENHANCED ITEM SIDE COVERAGE

BACKGROUND OF THE INVENTION

The present invention relates to optical scanners and more specifically to an optical scanner having enhanced item side coverage.

Commonly assigned U.S. Pat. Nos. 5,229,588, 5,684,289, and 5,886,336 disclose a dual aperture optical scanner. The scanning light beams from a laser diode pass through substantially horizontal and vertical apertures to provide more item coverage than a single aperture scanner. These patents are hereby incorporated by reference.

Known multi-aperture optical scanners produce scan patterns with gaps in item coverage. These gaps increase as the item is moved away from an ideal position in the center of the scan volume.

Therefore, it would be desirable to provide an optical scanner which is not only capable of reading a bar code label on any one of six orthogonal surfaces of an item oriented at right angles to the scanner, but is also capable of reading the bar code label if it is located on any intermediate surfaces between those orthogonal surfaces. Thus, it would be desirable to provide an optical scanner with true omnidirectional item coverage.

SUMMARY OF THE INVENTION

In accordance with the teachings of the present invention, an optical scanner having enhanced item side coverage is provided.

The optical scanner includes a scanner housing, a first optics assembly within the scanner housing including a horizontal aperture, and a second optics assembly including a second housing within the scanner housing including a substantially vertical aperture. The first and second optics assemblies are capable of scanning six sides of an item. At least one of the first and second optics assemblies additionally generates third scan lines for scanning an intermediate side of the item.

It is accordingly an object of the present invention to provide an improved dual aperture optical scanner having enhanced item coverage.

It is another object of the present invention to provide an improved dual aperture optical scanner which produces a scan pattern that effectively covers at least six sides of an item.

It is another object of the present invention to provide an improved dual aperture optical scanner which produces a scan pattern that effectively covers intermediate sides of an item.

It is another object of the present invention to provide an improved dual aperture optical scanner with improved capability of reading truncated bar code labels.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 7 describes the ray paths of the horizontal mirror basket;

FIG. 10 describes the ray paths of the vertical mirror basket.

DETAILED DESCRIPTION OF THE PREFERRED EMBODIMENT

Figure 1:
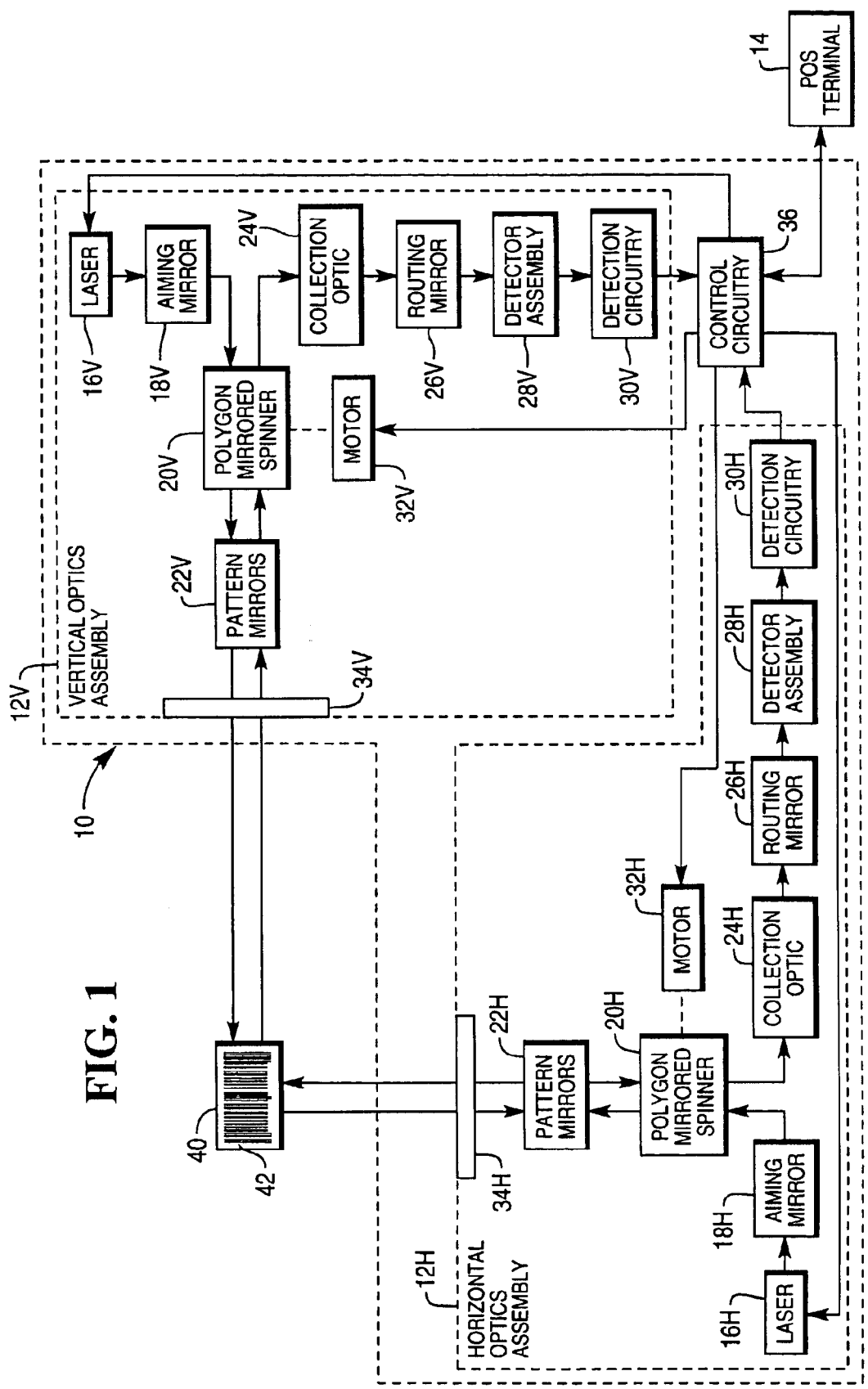
FIG. 1 is a block diagram of the optical scanner having enhanced item side coverage of the present invention.

Referring now to FIG. 1, optical scanner 10 includes horizontal optics assembly 12H and vertical optics assembly 12V, and control circuitry 36 for controlling horizontal and vertical optics assemblies 12H and 12V. If one of optics assemblies 12H and 12V fails, scanner 10 retains partial operation.

Horizontal optics assembly 12H projects a scan pattern (FIG. 6) through substantially horizontal aperture 34H to scan bar codes 42 located on bottom, leading, trailing and checker side surfaces of item 40. It will also scan bar codes 42 on intermediate surfaces including those between the bottom and customer side surfaces.

Horizontal optics assembly 12H includes laser 16H, aiming mirror 18H, polygon mirrored spinner 20H, pattern mirrors 22H, routing mirror 26H, collection optic 24H, detector assembly 28H, detection circuitry 30H, and motor 32H.

Laser 16H includes one or more laser diodes or other suitable laser sources. Laser 16H may include a laser having a wavelength of 650 nm.

Figure 4:
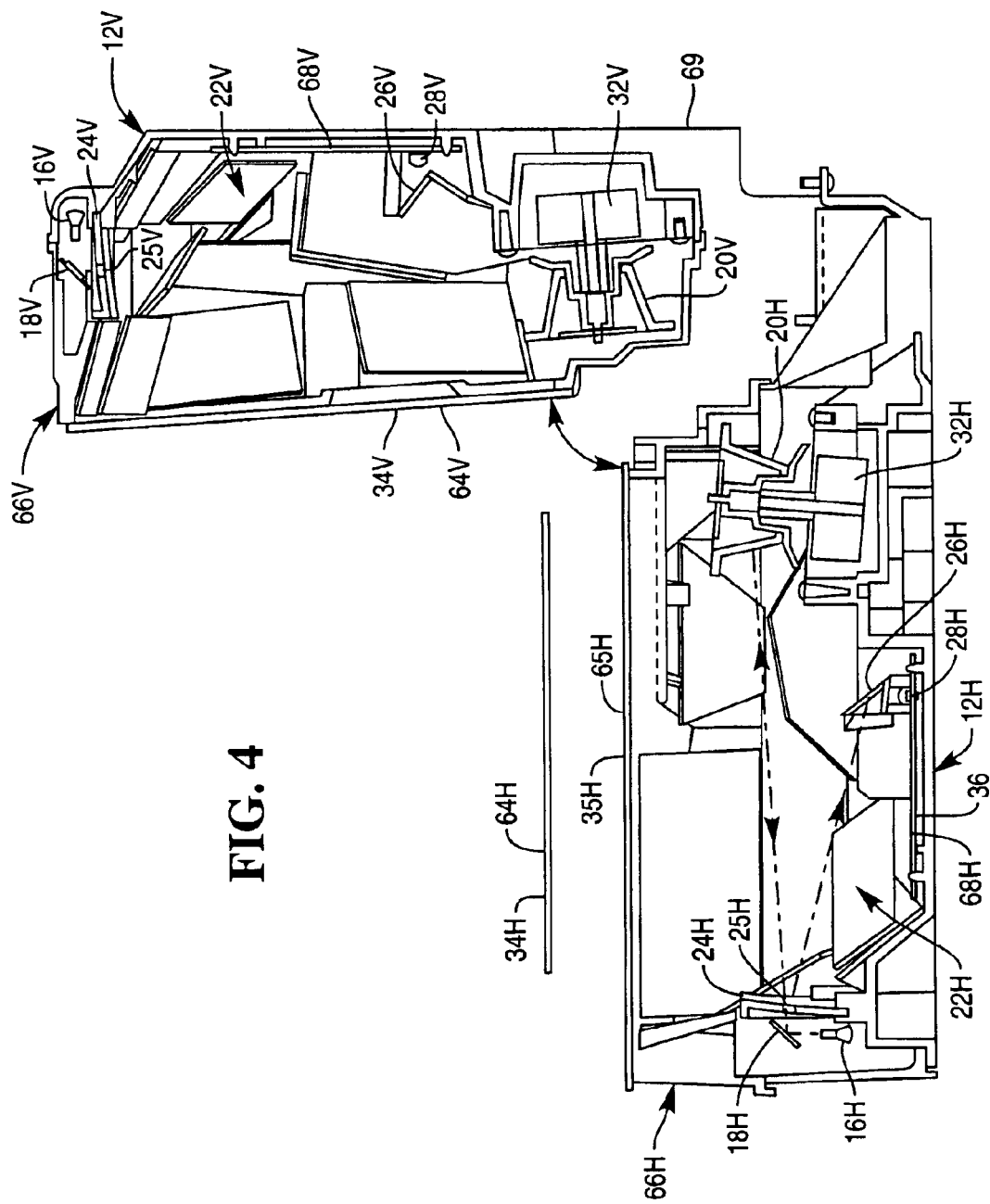
FIG. 4 is a sectional view of the scanner of the present invention along lines 4—4 of FIG. 3.

Aiming mirror 18H aims a laser beam from laser 16H to polygon mirrored spinner 20H. The laser beam passes through a hole 25H in collection optic 24H (FIG. 4).

Polygon mirrored spinner 20H directs the laser beam to pattern mirrors 22H. Polygon mirrored spinner 20H also routes collected light to collection optic 24H. Polygon mirrored spinner 20H preferably includes four facets, but may include other numbers of facets. Facets are grouped into two pairs. Two opposite facets have angles of 74 degrees and 76 degrees from the spinner base. The other pair of opposite facets have angles of 86.5 degrees and 88.5 degrees. Motor 32H rotates polygon mirrored spinner 20H.

Pattern mirrors 22H produce scanning light beams that emanate from substantially horizontal aperture 34H to form a horizontal scan pattern (FIG. 6) for reading bar code 42 on item 40. Pattern mirrors 22H also collect light reflected from item 40 and direct it to polygon mirrored spinner 20H.

Collection optic 24H routes collected light from polygon mirrored spinner 20H to routing mirror 26H.

Routing mirror 26H routes the collected light to detector assembly 28H.

Detector assembly 28H focuses, optically filters, and converts collected light into electrical signals.

Detection circuitry 30H obtains bar code information from the electrical signals. Detection circuitry 30H includes circuitry for digitizing bar code information.

Vertical optics assembly 12V projects a scan pattern (FIG. 9) from substantially vertical aperture 34V and primarily scans bar codes located on a customer side and top side of an item. Like horizontal optics assembly 12H, vertical optics assembly 12V scans the leading and trailing sides, as well as intermediate surfaces including those between the bottom and customer side surfaces.

Vertical optics assembly 12V includes laser 16V, aiming mirror 18V, polygon mirrored spinner 20V, pattern mirrors 22V, collection optic 24V, routing mirror 26V, detector assembly 28V, detection circuitry 30V, and motor 32V.

Laser 16V includes one or more laser diodes or other suitable laser sources. Laser 16V may include a similar source as laser 16H. However, in general lasers with different wavelengths and other characteristics may be used.

Aiming mirror 18V aims a laser beam from laser 16V to polygon mirrored spinner 20V. The laser beam passes through a hole 25V in collection optic 24V (FIG. 4).

Polygon mirrored spinner 20V directs the laser beam to pattern mirrors 22V. Polygon mirrored spinner 20V also routes collected light to collection optic 24V. Polygon mirrored spinner 20V preferably includes four facets, but may include other numbers of facets. The same spinner as spinner 20H may be used for vertical spinner 20V. Motor 32V rotates polygon mirrored spinner 20V.

Pattern mirrors 22V produce scanning light beams that emanate from substantially vertical aperture 34V to form a vertical scan pattern (FIG. 9) for reading bar code 42 on item 40. Pattern mirrors 22V also collect light reflected from item 40 and direct it to polygon mirrored spinner 20V.

Collection optic 24V routes collected light from polygon mirrored spinner 20V to routing mirror 26V.

Routing mirror 26V routes the collected light to detector assembly 28V.

Detector assembly 28V focuses, filters, and converts collected light into electrical signals.

Detection circuitry 30V obtains bar code information from the electrical signals. Detection circuitry 30V includes circuitry for digitizing bar code information.

Control circuitry 36 processes the electrical signals from detector assemblies 28H and assembly 28V to obtain bar code information. Control circuitry 36 passes the bar code information to POS terminal 14.

Control circuitry 36 controls operation of lasers 16H and 16V and motors 32H and 32V. Control circuitry 36 may remove power from lasers 16H and 16V and motors 32H and 32V to increase their longevity.

POS terminal 14 receives transaction data, for example, in the form of SKU numbers from scanner 10 and completes a transaction by finding price data for the SKU numbers in a price-lookup data file.

Figure 2:
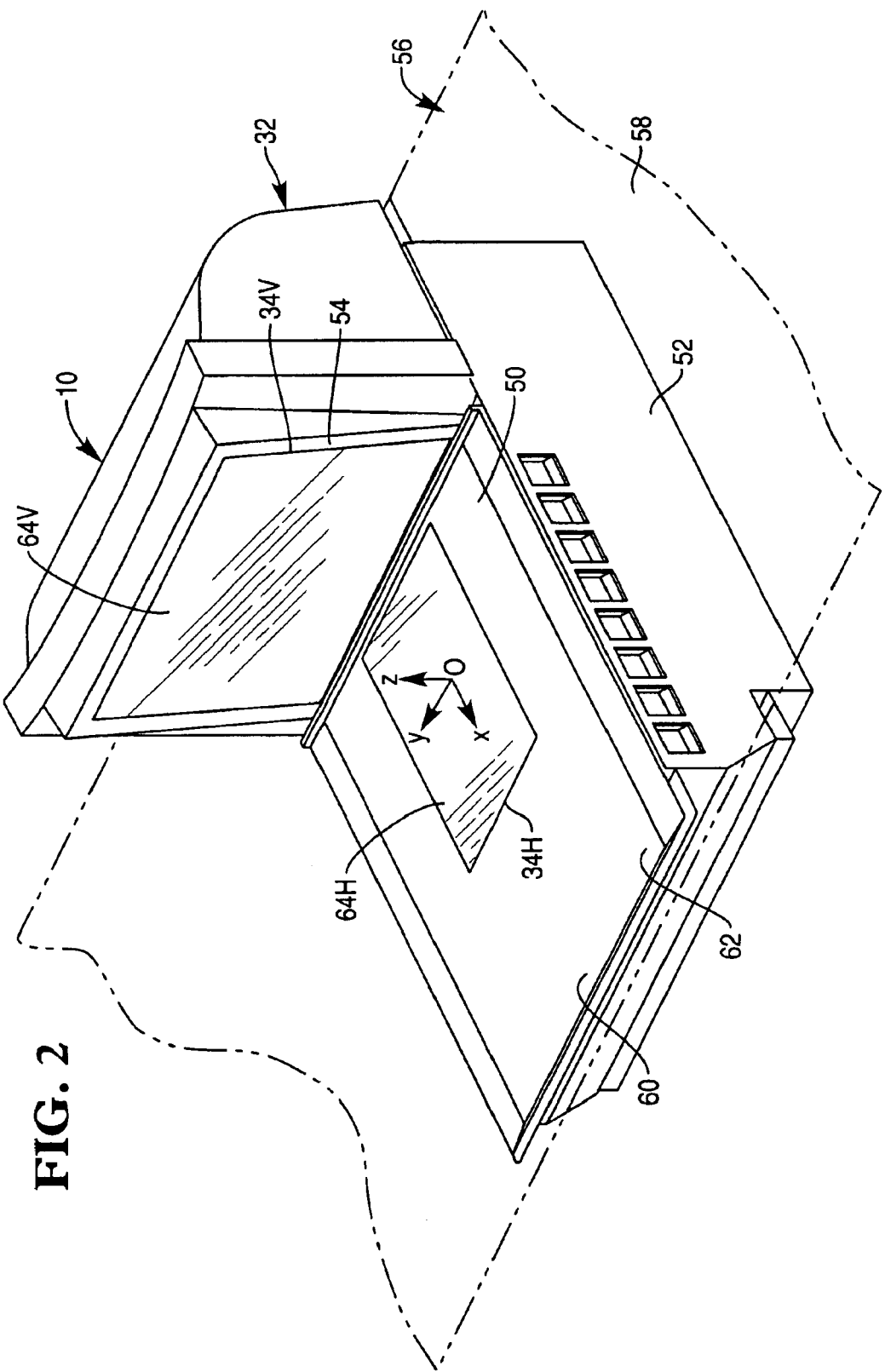
FIG. 2 is an exterior perspective view of the scanner of the present invention, including a reference coordinate system for the group of pattern mirrors within the scanner of the present invention.

Turning now to FIG. 2, scanner 10 is shown in perspective.

Scanner 10 as illustrated includes an integral scale 60. Scale 60 includes weigh plate 62, which includes substantially horizontal surface 50 and substantially horizontal aperture 34H. Horizontal window 64H is located within horizontal aperture 34H.

Substantially vertical aperture 34V is located within substantially vertical surface 54. Substantially vertical window 64V is located within substantially vertical aperture 34V.

Scanner 10 includes housing 52. Preferably, housing 52 may be easily adapted to fit in a typical checkout counter 56. It is envisioned that substantially horizontal surface 50 be made substantially flush with top surface 58 of counter 56. Scanner 10 is installed within checkout counter 56 so that substantially vertical aperture 34V faces a store employee or other operator.

An illustrated reference X-Y-Z coordinate system determines orientations of pattern mirrors 22H and 22V within scanner 10 of the present invention. Origin 0 is defined such that:

X=0 is on the centerline of the scanner;
Z=0 is on the centerline of the scanner; and
Y=0 is on the substantially horizontal surface 50.

The configuration of the various scanner components is best detailed in the Appendix submitted herewith. The data in the Appendix represents INR text files used by the Advanced Systems Analysis Program (ASAP™) software tool from Breault Research Organization, Inc. This commercially available and optics modeling program describes system geometry. In general, objects such as mirror surfaces are created at the origin and then rotated and translated (shifted) into position.

The file horizontal-aperture.inr describes the location and size of horizontal aperture 34H.

The file vertical-aperture.inr describes the location and size of substantially vertical aperture 34V.

The file top-mirrors.inr describes the locations and sizes of the top pattern mirrors of vertical optics assembly 12V.

The file bottom-mirrors.inr describes the locations and sizes of the bottom pattern mirrors of vertical optics assembly 12V.

The file front-mirrors.inr describes the locations and sizes of the front pattern mirrors of horizontal optics assembly 12H.

The file back mirrors.inr describes the locations and sizes of the back pattern mirrors of horizontal optics assembly 12H.

The file horizontal optics engine.inr describes the locations and sizes of all components in horizontal optics assembly 12H.

The file vertical optics engine.inr describes the locations and sizes of all components in vertical optics assembly 12H.

Figure 3:
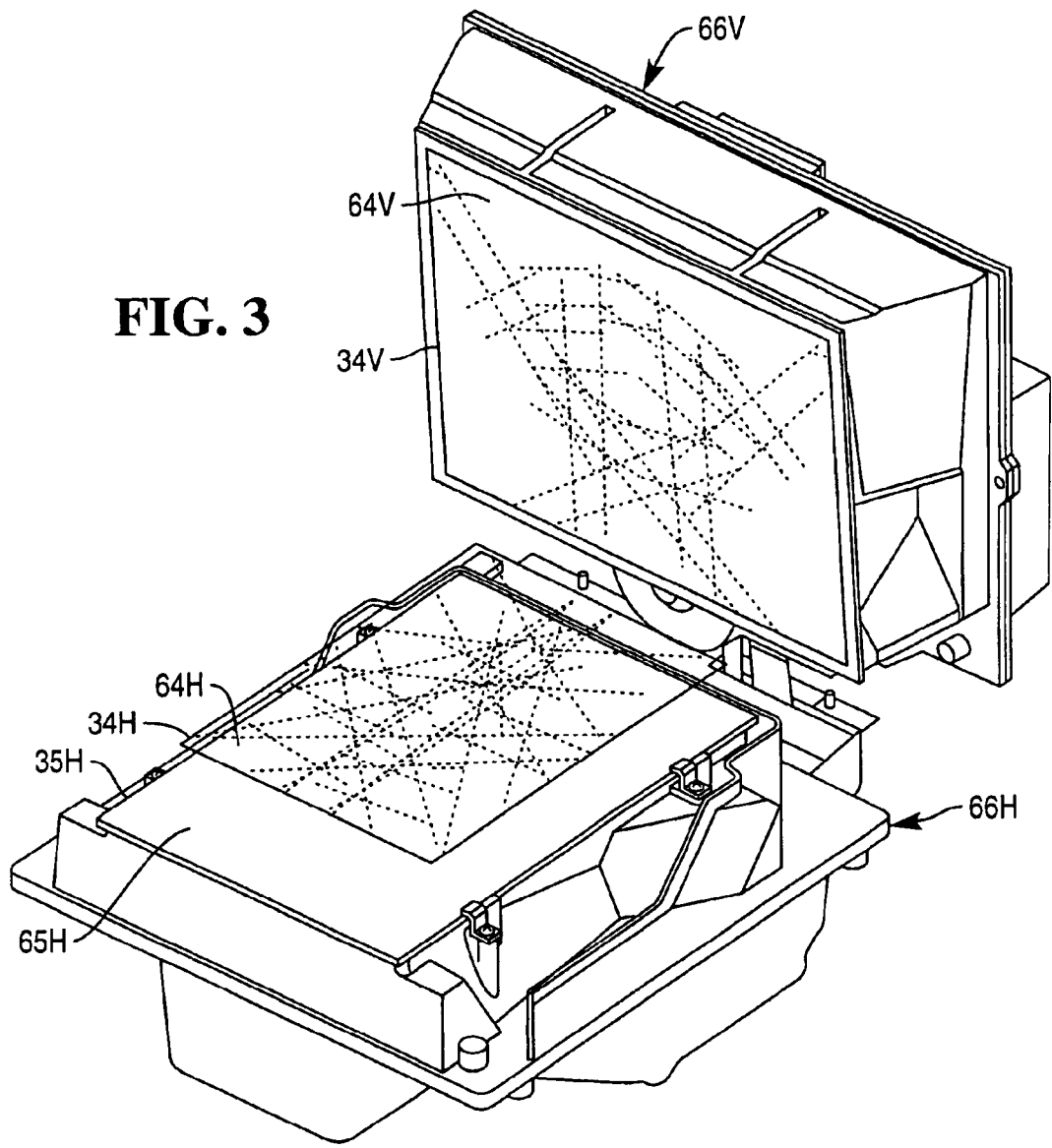
FIG. 3 is an interior perspective view of the scanner of the present invention, showing horizontal and vertical scanner portions.

Referring now to FIGS. 3–4, horizontal optics assembly 12H and vertical optics assembly 12V are shown in their positions within housing 52.

Horizontal optics assembly 12H and vertical optics assembly 12V each have nearly all of the optical components of a functional bar code scanner. Horizontal optics assembly 12H and vertical optics assembly 12V each have their own housings 66H and 66V and printed circuit boards 68H and 68V. In the illustrated example, control circuitry 36 is located in horizontal optics assembly 12H and signals vertical optics assembly 12V are brought to control circuitry 36 via cables 69.

Horizontal optics assembly 12H includes horizontal aperture 35H and window 65H. Scale weigh plate 62 with horizontal aperture 34H and window 64H are located above window 65H.

Horizontal optics assembly 12H will scan all label orientations on the bottom and checker sides of item 40, as well as certain orientations on the leading and trailing sides. Vertical optics assembly 12V will scan all label orientations on the customer and top sides of item 40, as well as certain orientations (complementary to horizontal optics assembly 12H) on the leading and trailing sides.

Control circuitry 36 combines detector outputs from horizontal and vertical optics assemblies 12H and 12V, so POS terminal 14 receives one set of bar code information data.

Optical pathing between laser 16H and polygon mirrored spinner 20H avoids contacting pattern mirrors 22H along the way. Laser 16H is located on a checker side of horizontal optics assembly 12H and polygon mirrored spinner 20H is located on the opposite side. Collection optic 24H is located adjacent laser 16H. The laser beam from laser 16H passes through hole 25H in collection optic 24H. Detector assembly 28H is located between collection optic 24H and polygon mirrored spinner 20H.

Optical pathing between laser 16V and polygon mirrored spinner 20V is similar to that of polygon mirrored spinner 20H, except that the optical path is shorter. Polygon mirrored spinner 20V is located in the bottom portion of vertical optics assembly 12V, adjacent to polygon mirrored spinner 20H, and laser 16V is located in the upper portion.

Spinners 20H and 20V are located where they are in order to generate suitable scan lines. In optics assembly 12H, the generation of the front vertical lines requires arcs of light reflected from a spinner 20H on the back side of the optical cavity. Similarly, for vertical optics assembly 12V, the generation of the top vertical lines requires arcs of light reflected from a spinner 20V on the bottom of the optical cavity.

Substantially vertical aperture 34V is oriented at an acute angle θ of about 86 degrees from substantially horizontal aperture 34H. Other angular configurations, acute and obtuse, are also anticipated by the present invention.

Operationally, lasers 16H and 16V emit laser beams onto aiming mirrors 18H and 18V, which reflect the laser beams through holes 25H and 25V in collection optics 24H and 24V and then onto mirrored polygon spinners 20H and 20V. The polygon facets further reflect the laser beams up or down (for horizontal assembly 12H) or forward or rearward (for vertical assembly 12V), depending upon the facet struck. As the facets rotate, the laser beams are scanned in a shallow arc and reflected onto pattern mirrors 22H and 22V. In some cases, primary pattern mirrors reflect the laser beams through apertures 34H and 34V onto surfaces of item 40. In other cases, the primary pattern mirrors reflect the laser beams onto secondary mirrors that reflect the laser beams through apertures 34H and 34V onto surfaces of item 40.

As item 40 is moved through the scan zone (above horizontal aperture 34H and in front of vertical aperture 34V), scan lines generated by the laser beams from horizontal and vertical apertures 34H and 34V strike bar code label 42, no matter where it is located on item 42. A scan line will pass through all or part of bar code label 40.

Item 42 scatters light back along the path of the incident laser light. The scattered light passes through horizontal and vertical apertures 34H and 34V, onto the secondary mirrors (if present), onto the primary mirrors and onto the polygon facets. The rotating facets reflect the scattered light onto collection optics 24H and 24V. Collection optics 24H and 24V focus the scattered light onto detector assemblies 28H and 28V by way of routing mirrors 26H and 26V. Detector assemblies 28H and 28V convert the scattered light into electrical signals for analog processing by pre-video circuitries 30H and 30V and digital processing by control circuitry 36.

Figure 5:
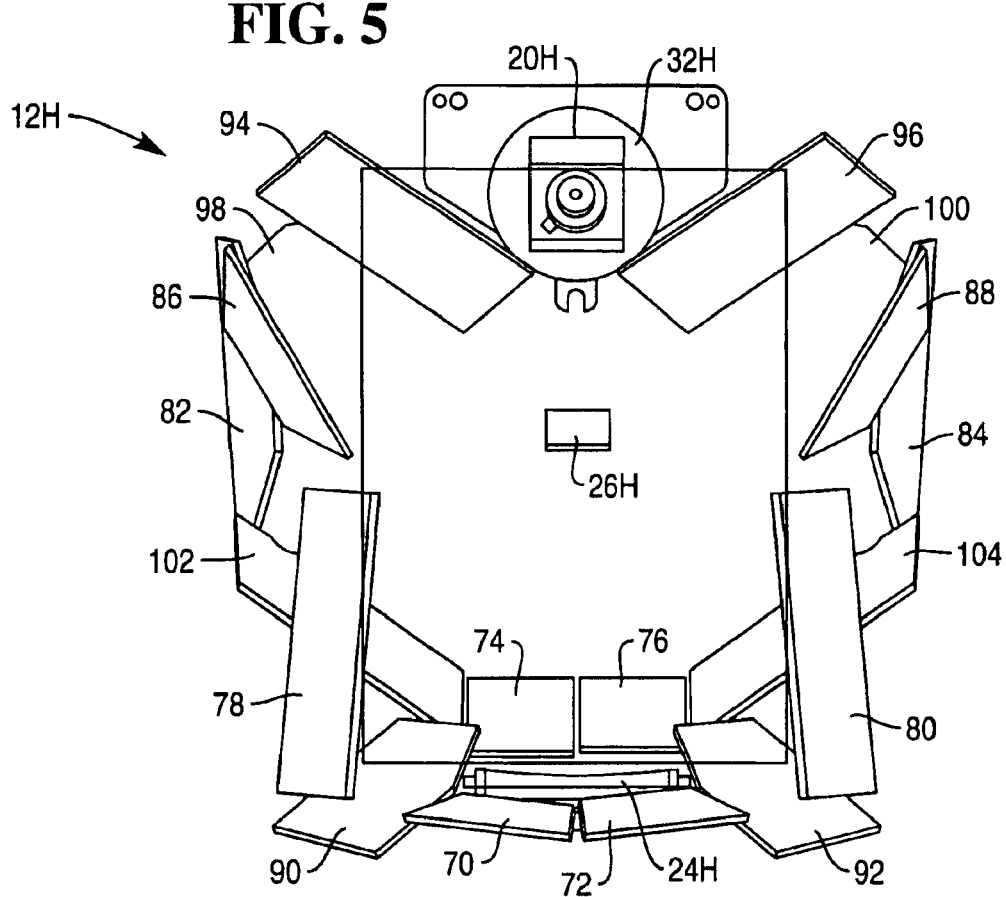
FIG. 5 is a top view of a horizontal mirror basket within a horizontal optics assembly.

Referring now to FIG. 5, pattern mirrors 22H are shown in detail. Horizontal pattern mirrors 22H include primary pattern mirrors and secondary pattern mirrors. The primary pattern mirrors receive a laser beam directly from spinner 20H. The secondary mirrors receive the laser beam from some of the primary pattern mirrors.

The term "front" as applied to mirrors means operator or checker side. The term "rear" as applied to mirrors means the side opposite to the operator or checker side. As illustrated, horizontal pattern mirrors 22H exhibit substantially bilateral symmetry between the leading and trailing sides of horizontal optics assembly 12H.

The primary pattern mirrors include left rear diagonal mirror 86, right rear diagonal mirror 88, left front vertical mirror 78, right front vertical mirror 80, left horizontal mirror 82, right horizontal mirror 84, left front picket mirror 70, right front picket mirror 72, left front diagonal mirror 102, right front diagonal mirror 104, left front bottom picket mirror 74, and right front bottom picket 76.

The secondary pattern mirrors include left rear diagonal mirror 94, right rear diagonal mirror 96, left front vertical mirror 90, right front vertical mirror 92, left horizontal mirror 98, and right horizontal mirror 100.

Figure 6:
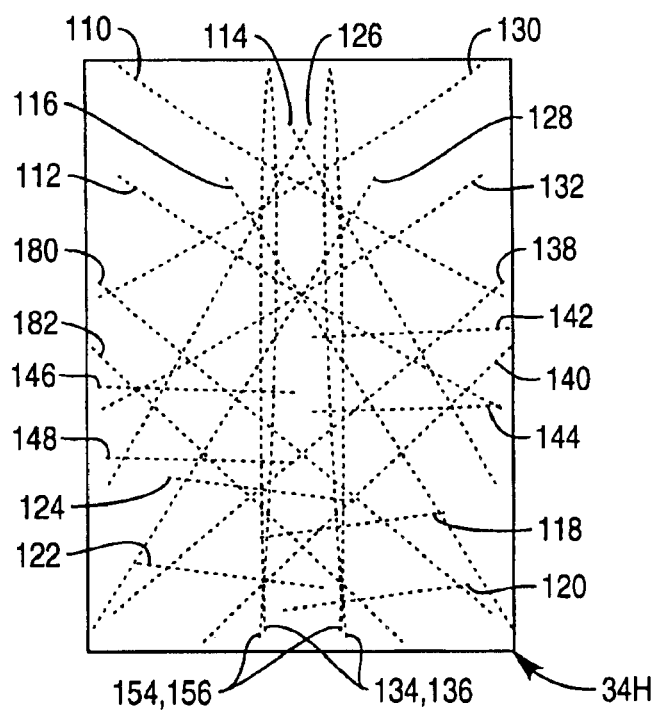
FIG. 6 is a plan view of the scan pattern emanating upwardly from the horizontal mirror basket.

Referring now to FIGS. 6 and 7, horizontal scan pattern for FIG. 4. The scan pattern from horizontal optics assembly 12H includes twelve pairs of scan lines for a total of twenty-four scan lines.

FIG. 7 describes the ray paths from spinner 20H to the primary and secondary pattern mirrors, and the various scan lines that result.

Each of five sides of item 40 is scanned by scan lines from horizontal optics assembly 12H.

Four scan lines scan the leading side of item 40: left front vertical scan line pair 126, 128, and left horizontal scan line pair 154, 156. The leading side of item 40 is the side that first passes over scanner 10 during a scanning motion.

Four scan lines scan the trailing side of item 40: right front vertical scan line pair 114, 116, and right horizontal scan line pair 134, 136. The trailing side of item 40 is the side that last passes over scanner 10 during a scanning motion.

Sixteen scan lines scan the operator side of item 40: right front vertical scan line pair 150, 152, right front diagonal scan line pair 138, 140, left front bottom picket scan line pair 146, 148, right front bottom picket scan line pair 142, 144, left front picket scan line pair 122, 124, right front picket scan line pair 118, 120, right front vertical scan line pair 114, 116, and left front vertical scan line pair 126, 128. The last two pairs also scan the trailing side and leading side, respectively. The operator side of item 40 is the side that faces the operator during a scanning motion.

All of the above twenty-four scan lines also omnidirectionally scan the bottom side of item 40. No scan lines cover the customer and top sides.

Additionally, four scan lines from horizontal optics assembly 12H scan the intermediate bottom customer side of item 40: right rear diagonal scan line pair 110, 112, and left rear diagonal scan line pair 130, 132. The customer side of item 40 is the side that faces away from the operator and normally towards the customer aisle during a scanning motion. The bottom side of item 40 is the side that faces downward towards-scanner 10 during a scanning motion. The intermediate bottom customer side is the side between the bottom and customer sides.

Thus, the greatest scan coverage is on the bottom side, followed by the operator side. The leading and trailing sides have similar coverage from horizontal optics assembly 12H. Significantly, coverage is also directed to the intermediate bottom customer side to cover an item that is not exactly placed in front of horizontal aperture 34H.

Figure 8:
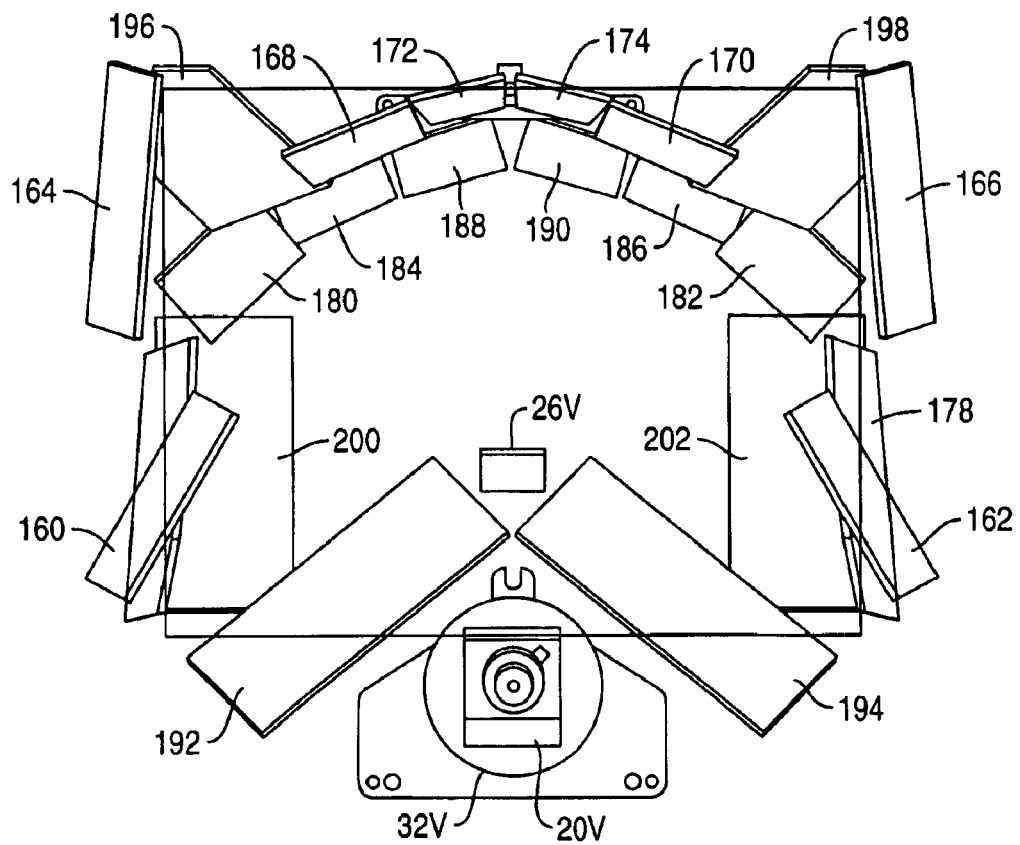
FIG. 8 is a front view of a vertical mirror basket within a vertical optics assembly.

Referring now to FIG. 8, pattern mirrors 22V are shown in detail. Vertical pattern mirrors 22V include primary pattern mirrors and secondary pattern mirrors. The primary pattern mirrors receive a laser beam directly from spinner 20V. The secondary mirrors receive the laser beam from some of the primary pattern mirrors.

The term "top" as applied to mirrors means the top side of vertical optics assembly 12V. The term "bottom" as applied to mirrors means the side opposite to the top side, which is the low side of vertical optics assembly 12V. As illustrated, vertical pattern mirrors 22V exhibit substantially bilateral symmetry between the leading and trailing sides of vertical optics assembly 12V.

The primary pattern mirrors include primary right rear diagonal mirror 88, primary right front vertical mirror 80, right front picket mirror 72, left front picket mirror 70, primary left front vertical mirror 78, primary left rear diagonal mirror 86, primary right horizontal mirror 84, right front diagonal mirror 104, right front bottom picket mirror 76, left front bottom picket mirror 74, left front diagonal mirror 102, and primary left horizontal mirror 82.

The secondary pattern mirrors include secondary left bottom diagonal mirror 192, secondary left top vertical mirror 196, secondary right top vertical mirror 198, secondary right bottom diagonal mirror 194, secondary left vertical mirror 200, and secondary right vertical mirror 202.

Figure 9:
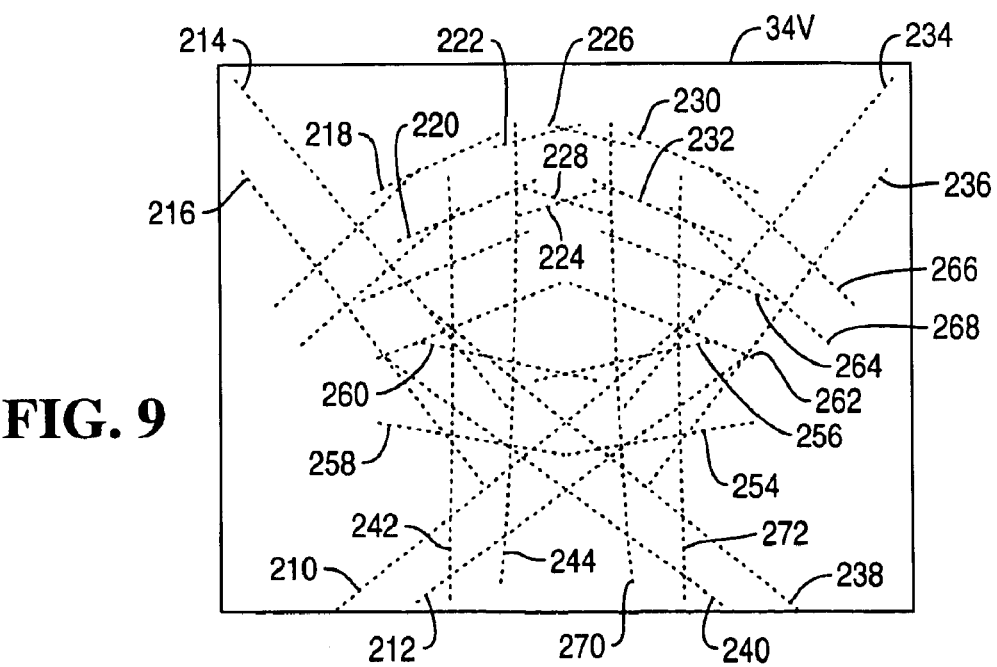
FIG. 9 is a plan view of the scan pattern emanating upwardly from the vertical mirror basket.

Referring now to FIGS. 9 and 10, vertical scan pattern for FIG. 6. The scan pattern from vertical optics assembly 12V includes sixteen pairs of scan lines for a total of thirty-two scan lines.

FIG. 10 describes the ray paths from spinner 20V to the primary and secondary pattern mirrors, and the various scan lines that result.

Each of five sides of item 40 is scanned by scanning beams from vertical optics assembly 12V.

Four scan lines scan the leading side of item 40: scan line pairs 214, 216 and 242, 244.

Four scan lines scan the trailing side of item 40: scan line pairs 234, 236 and 270, 272.

Twenty scan lines scan the top side of item 40: left top picket scan line pair 218, 220, left center top picket scan line pair 222, 224, right center top picket scan line pair 226, 228, right top picket scan line pair 230, 232, left top diagonal scan line pair 250, 252, left center top diagonal scan line pair 254, 256, right center top diagonal scan line pair 258, 260, right top diagonal scan line pair 262, 264, left top vertical scan line pair 214, 216, and right top vertical scan line pair 234, 236. The last two pairs also scan the leading side and trailing side, respectively.

All of the above thirty-two scan lines also omnidirectionally scan the customer side of item 40. No scan lines cover the bottom and operator sides.

Additionally, four scan lines from vertical optics assembly 12V scan the intermediate bottom customer side of item 40: left bottom diagonal scan line pair 210, 212, and right bottom diagonal scan line pair 238, 240.

Thus, the greatest scan coverage is on the customer side, followed by the top side. The leading and trailing sides have similar coverage from vertical optics assembly 12V. Significantly, coverage is also directed to the intermediate bottom customer side to cover an item that is not exactly placed in front of vertical aperture 34V.

Together, horizontal optics assembly 12H and vertical optics assembly 12V combine to cover at least six sides of item 40, with the greatest coverage being on the customer and bottom sides. The customer and bottom side patterns are truly omnidirectional and suited for scanning truncated bar code labels.

Advantageously, horizontal optics assembly 12H and vertical optics assembly 12V project patterns onto intermediate surfaces. In particular, horizontal optics assembly 12H and vertical optics assembly 12V project usable patterns onto intermediate angled surfaces, including intermediate customer bottom surfaces. Item 40 need not be positioned with bar code label 42 facing vertically at vertical aperture 34V or facing horizontally at horizontal aperture 34H. Bar code label 42 may face in a diagonal direction between horizontal and vertical directions and still be scanned.

Eight scan lines cover the leading side, four scan lines from horizontal optics assembly 12H and four scan lines from vertical optics assembly 12V.

Eight scan lines cover the trailing side, four scan lines from horizontal optics assembly 12H and four scan lines from vertical optics assembly 12V.

The operator and bottom sides are covered by horizontal optics assembly 12H. Twenty-four scan lines omnidirectionally cover the bottom side. Sixteen scan lines cover the operator side.

The top and customer sides are covered by vertical optics assembly 12V. Thirty-two scan lines omnidirectionally cover the customer side. Twenty scan lines cover the top side.

Significantly, eight scan lines cover the intermediate bottom customer sides, four scan lines from horizontal optics assembly 12H and four from scan lines vertical optics assembly 12V.

Although the invention has been described with particular reference to certain preferred embodiments thereof, variations and modifications of the present invention can be effected within the spirit and scope of the following claims.

Appendix

The present application hereby incorporates the following Appendix material, including the following text files used by the Advanced Systems Analysis Program (ASAP™) software tool from Breault Research Organization, Inc.:

back-mirrors.inr
bottom-mirrors.inr
front-mirrors.inr
horizontal optics engine.inr
horizontal-aperture.inr
top-mirrors.inr
vertical-aperture.inr
vertical optics engine.inr back-mirrors.inr

```
!!BACK MIRRORS
!!Nov. 12, 2002
!!GENERATE BACK VERTICAL MIRRORS.
$CASE UPPER
!!LCTD
EDGE; POINTS Z 0, 0 0 1, 0 1.22 1, -1.25 1.22 1, -1.25 0 1
ROTATE Z 0 0 0; ROTATE X 60 0 0; ROTATE Z 16 0 0; SHIFT -.05 5.45 -6.85
OBJECT; 0.1 'BACK.LCTD'; INTERFACE 1 0; REDEFINE COLOR 13
!!RCTD
EDGE; POINTS Z 0, 0 0 1, 1.25 0 1, 1.25 1.22 1, 0 1.22 1
ROTATE Z 0 0 0; ROTATE X 60 0 0; ROTATE Z -16 0 0; SHIFT .05 5.45 -6.85
OBJECT; 0.1 'BACK.RCTD'; INTERFACE 1 0; REDEFINE COLOR 13
!!LTD
EDGE; POINTS Z 0, 0 0 1, 0 1.35 1, -1.35 1.35 1, -1.35 0 1
ROTATE Z 0 0 0; ROTATE X 47.5 0 0; ROTATE Z 25 0 0; SHIFT -1.3 5.125 -6.85
OBJECT; 0.1 'BACK.LTD'; INTERFACE 1 0; REDEFINE COLOR 13
!!RTD
EDGE; POINTS Z 0, 0 0 1, 1.35 0 1, 1.35 1.35 1, 0 1.35 1
ROTATE Z 0 0 0; ROTATE X 47.5 0 0; ROTATE Z -25 0 0; SHIFT 1.3 5.125 -6.85
```

-continued

OBJECT; 0.1 'BACK.RTD'; INTERFACE 1 0; REDEFINE COLOR 13
!!LD
EDGE; POINTS Z 0, 0 0 1, 0 1.35 1, −1.5 1.35 1, −1.5 0 1
ROTATE Z 0 0 0; ROTATE X 39 0 0; ROTATE Z 40 0 0; SHIFT
−2.375 4.46 −6.71
OBJECT; 0.1 'BACK.LD'; INTERFACE 1 0; REDEFINE COLOR 13
!!RD
EDGE; POINTS Z 0, 0 0 1, 1.5 0 1, 1.5 1.35 1, 0 1.35 1
ROTATE Z 0 0 0; ROTATE X 39 0 0; ROTATE Z −40 0 0; SHIFT
2.375 4.46 −6.71
OBJECT; 0.1 'BACK.RD'; INTERFACE 1 0; REDEFINE COLOR 13
!!PLV
EDGE; POINTS Z 0, 0 0 1, 0 1.45 1, −(3.15−1) 1.45 1, −3.15
1.45−.4 1, −3.15 0 1
ROTATE Z −9 0 0; ROTATE X 110 0 0; ROTATE Z 82 0 0; SHIFT
−4.125 3.325 −6.8
OBJECT; 0.1 'BACK.PLV'; INTERFACE 1 0; REDEFINE COLOR 13
!!PRV
EDGE; POINTS Z 0, 0 0 1, 3.15 0 1, 3.15 1.45−.4 1, 3.15−1
1.45 1, 0 1.45 1
ROTATE Z 9 0 0; ROTATE X 110 0 0; ROTATE Z −82 0 0; SHIFT
4.125 3.325 −6.8
OBJECT; 0.1 'BACK.PRV'; INTERFACE 1 0; REDEFINE COLOR 13
!!SLV
EDGE; POINTS Z 0, 0 1.55/2 1, −3.4 1.55/2 1, −3.4 −1.55/2 1,
0 −1.55/2 1
ROTATE Z 0 0 0; ROTATE X −2 0 0; ROTATE Z 90 0 0; SHIFT −3.3
3.75 −6.885
OBJECT; 0.1 'BACK.SLV'; INTERFACE 1 0; REDEFINE COLOR 13
!!SRV
EDGE; POINTS Z 0, 0 1.55/2 1, 0 −1.55/2 1, 3.4 −1.55/2 1,
3.4 1.55/2 1
ROTATE Z 0 0 0; ROTATE X −2 0 0; ROTATE Z −90 0 0; SHIFT 3.3
3.75 −6.885
OBJECT; 0.1 'BACK.SRV'; INTERFACE 1 0; REDEFINE COLOR 13
PLOT FACETS OVERLAY; RETURN
bottom-mirrors.inr !!BOTTOM MIRRORS
!!Nov. 12, 2002
!!GENERATE BOTTOM HORIZONTAL MIRRORS.
$CASE UPPER
!!PLH
EDGE; POINTS Z 0, 0 0 1, 0 1.35−.8 1, −(3.35−1.45)/2 1.35 1,
−3.35+(3.35−1.45)/2 1.35 1, −3.35 1.35−.8 1, −3.35 0 1
ROTATE Z 10 0 0; ROTATE X 23 0 0; ROTATE Y 98 0 0; SHIFT
−4.15 −3.9 −2.55+1
!!OBJECT; 0.1 'BOTTOM.PLH'; INTERFACE 1 0; REDEFINE
COLOR 10
!!PRH
EDGE; POINTS Z 0, 0 0 1, 3.35 0 1, 3.35 1.35−.8 1, 3.35−
(3.35−1.45)/2 1.35 1, (3.35−1.45)/2 1.35 1, 0 1.35−.8 1
ROTATE Z −10 0 0; ROTATE X 22 0 0; ROTATE Y −98 0 0; SHIFT
4.15 −3.9 −2.55+1
OBJECT; 0.1 'BOTTOM.PRH'; INTERFACE 1 0; REDEFINE
COLOR 10
!!SLH
EDGE; POINTS Z 0, (3.85/2) 0 1, (3.85/2) (1.4−.5) 1,
(2.85/2) 1.4 1, (−2.85/2) 1.4 1, (−3.85/2) (1.4−.5) 1,
(−3.85/2) 0 1
ROTATE Z 0 0 0; ROTATE X −88 0 0; ROTATE Y 90 0 0; SHIFT
−2.5 −4.525 −.775+1
!!OBJECT; 0.1 'BOTTOM.SLH'; INTERFACE 1 0; REDEFINE
COLOR 10
!!SRH
EDGE; POINTS Z 0, (3.85/2) 0 1, (3.85/2) (1.4−.5) 1,
(2.85/2) 1.4 1, (−2.85/2) 1.4 1, (−3.85/2) (1.4−.5) 1,
(−3.85/2) 0 1
ROTATE Z 0 0 0; ROTATE X −88 0 0; ROTATE Y −90 0 0; SHIFT
2.5 −4.525 −.775+1
OBJECT; 0.1 'BOTTOM.SRH'; INTERFACE 1 0; REDEFINE
COLOR 10
!!LFD
EDGE; POINTS Z 0, 0 0 1, 3.15 0 1, 2.65 1.35 1, −.5 1.35 1
ROTATE Z 0 0 0; ROTATE X −30 0 0; ROTATE Y 145 0 0; SHIFT
−1.36 −4.8 2.53+1
OBJECT; 0.1 'BOTTOM.LFD'; INTERFACE 1 0; REDEFINE
COLOR 10
!!RFD
EDGE; POINTS Z 0, 0 0 1, .5 1.35 1, −2.65 1.35 1, −3.15 0 1
ROTATE Z 0 0 0; ROTATE; X −30 0 0; ROTATE Y −145 0 0; SHIFT
1.36 −4.8 2.53+1
!!OBJECT; 0.1 'BOTTOM.RFD'; INTERFACE 1 0; REDEFINE
COLOR 10
!!LFBP
EDGE; POINTS Z 0, 1.25/2 0 1, 1.25/2 1.35 1, −1.25/2 1.35 1,
−1.25/2 0 1
ROTATE Z 0 0 0; ROTATE X −40 0 0; ROTATE Y 180 0 0; SHIFT
−.65 −4.7 2.65+1
!!OBJECT; 0.1 'BOTTOM.LFBP'; INTERFACE 1 0; REDEFINE
COLOR 10
!!RFBP
EDGE; POINTS Z 0, 1.25/2 0 1, 1.25/2 1.35 1, −1.25/2 1.35 1,
−1.25/2 0 1
ROTATE Z 0 0 0; ROTATE X −37 0 0; ROTATE Y −180 0 0; SHIFT
.65 −4.7 2.65+1
OBJECT; 0.1 'BOTTOM.RFBP'; INTERFACE 1 0; REDEFINE
COLOR 10
PLOT FACETS OVERLAY; RETURN
front-mirrors.inr !!FRONT MIRRORS
!!Nov. 12, 2002
!!GENERATE FRONT VERTICAL MIRRORS.
$CASE UPPER
!!LCTP
EDGE; POINTS Z 0, 0 0 1, −1.1 0 1, −(1.1−(1.1−.9)/2) −1.35
1, −(1.1−.9)/2 −1.35 1
ROTATE Z 0 0 0; ROTATE X 76 0 0; ROTATE Z 13 0 0; SHIFT −.05
6.5 −3.2
OBJECT; 0.1 'FRONT.LCTP'; INTERFACE 1 0; REDEFINE COLOR 12
!!RCTP
EDGE; POINTS Z 0, 0 0 1, (1.1−.9)/2 −1.35 1, 1.1−(1.1−.9)/2
−1.35 1, 1.1 0 1
ROTATE Z 0 0 0; ROTATE X 76 0 0; ROTATE Z −13 0 0; SHIFT .05
6.5 −3.2
OBJECT; 0.1 'FRONT.RCTP'; INTERFACE 1 0; REDEFINE
COLOR 12
!!LTP
EDGE; POINTS Z 0, 0 0 1, −1.6 0 1, −1.4 −1.4 1, 0 −1.4 1
ROTATE Z 0 0 0; ROTATE X 71.5 0 0; ROTATE Z 23 0 0; SHIFT
−1.15 6.2 −3.225
OBJECT; 0.1 'FRONT.LTP'; INTERFACE 1 0; REDEFINE COLOR 12
!!RTP
EDGE; POINTS Z 0, 0 0 1, 0 −1.4 1, 1.4 −1.4 1, 1.6 0 1
ROTATE Z 0 0 0; ROTATE X 71.5 0 0; ROTATE Z −23 0 0; SHIFT
1.15 6.2 −3.225
OBJECT; 0.1 'FRONT.RTP'; INTERFACE 1 0; REDEFINE COLOR 12
!!PLTV
EDGE; POINTS Z 0, 0 0 1, −3 0 1, −3 −1.35 1, 0 −1.35 1
ROTATE Z 7 0 0; ROTATE X 114 0 0; ROTATE Z 88 0 0; SHIFT −4
6.525 −3.2
OBJECT; 0.1 'FRONT.PLTV'; INTERFACE 1 0; REDEFINE
COLOR 12
!!PRTV
EDGE; POINTS Z 0, 0 0 1, 0 −1.35 1, 3 −1.35 1, 3 0 1
ROTATE Z −7 0 0; ROTATE X 114 0 0; ROTATE Z −88 0 0; SHIFT 4
6.525 −3.2
OBJECT; 0.1 'FRONT.PRTV'; INTERFACE 1 0; REDEFINE
COLOR 12
!!SLTV
EDGE; POINTS Z 0, 0 0 1, .75 −1.145 1, 2.75 −1.145 1, 2.75
.555 1, .32 .555 1
ROTATE Z −50 0 0; ROTATE X 52 0 0; ROTATE Z −7 0 0; SHIFT
−4.105 6.6 −3.53
OBJECT; 0.1 'FRONT.SLTV'; INTERFACE 1 0; REDEFINE
COLOR 12
!!SRTV
EDGE; POINTS Z 0, 0 0 1, −.32 .555 1, −2.75 .555 1, −2.75 −
−1.145 1, −.75 −1.145 1
ROTATE Z 50 0 0; ROTATE X 52 0 0; ROTATE Z 7 0 0; SHIFT
4.105 6.6 −3.53
OBJECT; 0.1 'FRONT.SRTV'; INTERFACE 1 0; REDEFINE
COLOR 12
!!PLBD
EDGE; POINTS Z 0, 0 0 1, −2.5 0 1, −2.5 −1.35 1, 0 −1.35 1
ROTATE Z 0 0 0; ROTATE X 112 0 0; ROTATE Z 60 0 0; SHIFT
−3.15 2.6 −3.8

-continued

```
OBJECT; 0.1 'FRONT.PLD'; INTERFACE 1 0; REDEFINE COLOR 12
!!PRBD
EDGE; POINTS Z 0, 0 0 1, 0 -1.35 1, 2.5 -1.35 1, 2.5 0 1
ROTATE Z 0 0 0; ROTATE X 112 0 0; ROTATE Z -60 0 0; SHIFT
3.15 2.6 -3.8
OBJECT; 0.1 'FRONT.PRD'; INTERFACE 1 0; REDEFINE COLOR 12
!!SLBD
EDGE; POINTS Z 0, 0 0 1, 0 1.35 1, -3.75 1.35 1, -3.75 0 1
ROTATE Z 27 0 0; ROTATE X 28 0 0; ROTATE Z -165 0 0; SHIFT
-3.75 -.2 -5.925
OBJECT; 0.1 'FRONT.SLD'; INTERFACE 1 0; REDEFINE COLOR 12
!!SRBD
EDGE; POINTS Z 0, 0 0 1, 3.75 0 1, 3.75 1.35 1, 0 1.35 1
ROTATE Z -27 0 0; ROTATE X 28 0 0; ROTATE Z 165 0 0; SHIFT
3.75 -.2 -5.925
OBJECT; 0.1 'FRONT.SRD'; INTERFACE 1 0; REDEFINE COLOR 12
PLOT FACETS OVERLAY; RETURN
horizontal optics engine.inr !!HORIZONTAL OPTICS ENGINE
!!Nov. 12, 2002
!!GENERATE OPTICS ENGINE (SPINNER, DETECTOR, ROUTING
MIRROR & COLLECTOR)
!!FOR HORIZONTAL SCANNER. TRACE RAYS.
$CASE UPPER
!!DEFINE IN NOMINAL ORIENTATION THEN MOVE INTO PLACE
AS A GROUP.
!!HORIZONTAL ROTATION AND TRANSLATION PARAMETERS.
XRH=-90; YRH=180; ZRH=0 XH=0; YH=-3.035; ZH=3.9+1
!!COLLECTOR ORIGIN.
XC=0; YC=0; ZC=0
!!LASER ORIGIN AND AXIS THROUGH COLLECTOR DEFINES
INTERSECTION OF
!!LASER WITH COLLECTOR SURFACE.
XL=(XC); YL=(YC); ZL=(ZC); AL=0; BL=-COS[4]; CL=SIN[4]
!!SPINNER FACET
SFD=6.265 !!DISTANCE FROM LASER ORIGIN TO SPINNER FACET
CENTER FOR HORIZONTAL SCANNER.
!!SFD=? !!DISTANCE FROM LASER ORIGIN TO SPINNER FACET
CENTER FOR VERTICAL SCANNER.
XF=(XC); YF=(YC)+(SFD*BL); ZF=(ZL)+(SFD*CL) !!NOMINAL
INTERSECTION OF FACET AND LASER.
!!SPINNER ORIGIN AND AXIS
HHS=.4; RS=.65; AS=0; BS=-SIN[4.75]; CS=COS[4.75]
XS=(XF); YS=(YF) - (RS*CS); ZS=(ZF) + (RS*BS)
!!SPINNER DEFINITION
DR1=(HHS)*TAN[-14]; DR2=(HHS)*TAN[-1.5]; DR3=(HHS)*TAN
[-16]; DR4=(HHS)*TAN[-3.5]
EDGE; POINTS (-RS-DR4) (-RS-DR1) - (HHS) 1; (RS+DR2) (-RS-
DR1) - (HHS) 1; (RS+DR2) (RS+DR3) - (HHS) 1; (-RS-DR4)
(RS+DR3) - (HHS) 1
EDGE; POINTS (-RS+DR4) (-RS-DR1) (HHS) 1; (RS-DR2) (-RS+
DR1) (HHS) 1; (RS-DR2) (RS-DR3) (HHS) 1; (-RS+DR4) (RS-
DR3) (HHS) 1
OBJECT; .1 .2 'SPINNER'; INTERFACE 1 0; REDEFINE COLOR 22
ROTATE X 4.75 0 0; ROTATE Y 0 0 0; ROTATE Z 0 0 0; SHIFT
(XS) (YS) (ZS)
ROTATE X (XRH) 0 0; ROTATE Y (YRH) 0 0; ROTATE Z (ZRH) 0 0;
SHIFT (XH) (YH) (ZH) !!MOVE FOR HORIZONTAL SCANNER.
!!DETECTOR
XD=(XC); YD=(YC)-4.25; ZD=(ZC)-1.58
EDGE; POINTS .059 .059 0 1; -.059 .059 0 1; -.059 -.059 0 1;
.059 -. 059 0 1
OBJECT; .1 'DETECTOR'; INTERFACE 0 0; REDEFINE COLOR 8
ROTATE X 0 0 0; ROTATE Y 0 0 0; ROTATE Z 0 0 0; SHIFT (XD)
(YD) (ZD)
ROTATE X (XRH) 0 0; ROTATE Y (YRH) 0 0; ROTATE Z (ZRH) 0 0;
SHIFT (XH) (YH) (ZH) !!MOVE FOR HORIZONTAL SCANNER.
!!ROUTING MIRROR
XRM=(XD); YRM=(YD); ZRM=(ZC)-1.13; TILTI=90+ATAN[(ZL-
ZRM)/(YL-YRM)]; TILTRM=-180+(TILTI)/2
EDGE; POINTS .375 .2 0 1; -.375 .2 0 1; -.375 -.475 0 1,
.375 -.475 0 1
OBJECT; .1 'ROUTING-MIRROR'; INTERFACE 1 0; REDEFINE
COLOR 4
ROTATE X (TILTRM) 0 0; ROTATE Y 0 0 0; ROTATE Z 0 0 0; SHIFT
(XRM) (YRM) (ZRM)
ROTATE X (XRH) 0 0; ROTATE Y (YRH) 0 0; ROTATE Z (ZRH) 0 0;
SHIFT (XH) (YH) (ZH) !!MOVE FOR HORIZONTAL SCANNER.
!!LAYOUT
ID=SQRT((XL-XRM)^2+(YL-YRM)^2+(ZL-ZRM)^2)+(ZRM-ZD);
OD=18
XI=XL; YI=(YL)-(ID)*SIN[TILTI]; ZI=(ZL)+(ID)*COS[TILTI]
XO=XL; YO=(YL)+(OD*BL); ZO=(ZL)+(OD*CL)
EDGE; POINTS (XI) (YI) (ZI) 1; (XO) (YO) (ZO) 1; (XL) (YL)
(ZL) 1; (XRM) (YRM) (ZRM) 1; (XD) (YD) (ZD) 1
!!OBJECT; .1 'LAYOUT'; INTERFACE 0 0; REDEFINE COLOR 4
ROTATE X (XRH) 0 0; ROTATE Y (YRH) 0 0; ROTATE Z (ZRH) 0 0;
SHIFT (XH) (YH) (ZH) !!MOVE FOR HORIZONTAL SCANNER.
!!DEFINE MOVED LASER ORIGIN AND AXIS.
!!MAKE THIS MORE GENERAL LATER.
YLOLD=YL; XL=(-XL+XH); YL=(ZL+YH); ZL=(YLOLD+ZH);
BLOLD=(BL); AL=-(AL); BL=(CL); CL=(BLOLD)
!!DEFINE MOVED SPINNER ORIGIN AND AXIS.
!!MAKE THIS MORE GENERAL LATER.
YSOLD=YS; XS=(-XS+XH); YS=(ZS+YH); ZS=(YSOLD+ZH);
BSOLD=(BS); AS=-(AS); BS=(CS); CS=(BSOLD)
!!PLOT FACETS OVERLAY
!!PLOT EDGES OVERLAY
!!$GO quit
!!$GO jump
!!RUN COMPLETE ROTATION AND OUTPUT.
$ECHO NONE
$IO OUTPUT HORIZONTAL ONLY
$IO OUTPUT DELETE
$IO VECTOR REWIND
FANGLE=360; STEPS=4; NSTEPS=(FANGLE) * (STEPS)
$DO 1 (NSTEPS)
{
GROUP SPINNER
ANGLE=(1/STEPS); ROTATE (ANGLE) ABOUT (AS), (BS), (CS) (XS)
(YS) (ZS)
RAYSET Y (YL); (ZL) (XL); SOURCE DIRECTION (AL) (BL) (CL);
TRACE PLOT OVERLAY
GET; R=(?/STEPS)
$IO OUTPUT HORIZONTAL ONLY
$IO OUTPUT APPEND
$SCR 1
\CURR_OBJ \ \R.2 \ \FLUX.8 \ \OPL.8 \ \X_POS_B.8 \
\Y_POS_B.8 \ \Z_POS_B.8 \ \X_DIR_B.8 \ \Y_DIR_B.8 \
\Z_DIR_B.8 \
$IO OUTPUT CLOSE
}
$GO skip
jump
!!RUN PARTIAL ROTATIONS.
FANGLE=90; STEPS=4; NSTEPS=(FANGLE) * (STEPS); JANGLE=90-
(FANGLE)
GROUP SPINNER
ROTATE 0 ABOUT (AS), (BS), (CS) (XS) (YS) (ZS)
$DO 1 (NSTEPS)
{
GROUP SPINNER
ANGLE=(1/STEPS); ROTATE (ANGLE) ABOUT (AS), (BS), (CS) (XS)
(YS) (ZS)
RAYSET Y (YL); (ZL) (XL); SOURCE DIRECTION (AL) (BL) (CL);
TRACE PLOT OVERLAY
}
!!$GO skip
GROUP SPINNER; ROTATE 90 ABOUT (AS), (BS), (CS) (XS) (YS)
(ZS)
GROUP SPINNER; ROTATE (JANGLE) ABOUT (AS), (BS), (CS)
(XS) (YS) (ZS)
$DO 1 (NSTEPS)
{
GROUP SPINNER
ANGLE=(1/STEPS); ROTATE (ANGLE) ABOUT (AS), (BS), (CS) (XS)
(YS) (ZS)
RAYSET Y (YL); (ZL) (XL); SOURCE DIRECTION (AL) (BL) (CL);
TRACE PLOT OVERLAY
}
!!$GO skip
GROUP SPINNER; ROTATE (JANGLE) ABOUT (AS), (BS), (CS) (XS)
(YS) (ZS)
$DO 1 (NSTEPS)
{
GROUP SPINNER
ANGLE=(1/STEPS); ROTATE (ANGLE) ABOUT (AS), (BS), (CS) (XS)
```

-continued (YS) (ZS)
RAYSET Y (YL); (ZL) (XL); SOURCE DIRECTION (AL) (BL) (CL);
TRACE PLOT OVERLAY
}
GROUP SPINNER; ROTATE (JANGLE) ABOUT (AS), (BS), (CS) (XS)
(YS) (ZS)
$DO 1 (NSTEPS)
{
GROUP SPINNER
ANGLE=(1/STEPS); ROTATE (ANGLE) ABOUT (AS), (BS), (CS) (XS)
(YS) (ZS)
RAYSET Y (YL); (ZL) (XL); SOURCE DIRECTION (AL) (BL) (CL);
TRACE PLOT OVERLAY
}
skip
quit
!!$VIEW
RETURN
horizontal-aperture.inr !!HORIZONTAL APERTURE
!!Nov. 12, 2002
!!GENERATE HORIZONTAL APERTURE AND BLOCKER.
$CASE UPPER
!!HORIZONTAL-APERTURE
EDGE; POINTS Y 0, 4.65 2.5 1, -2.35 2.5 1, -2.35 -2.5 1,
4.65 -2.5 1
OBJECT; 0.1 'HORIZONTAL-APERTURE'; INTERFACE 0 0;
REDEFINE COLOR 2
!!HORIZONTAL BLOCKER
EDGE; POINTS Y 0, 10 5.75 1, -10 5.75 1, -10 -5.75 1, 10
-5.75 1
!!OBJECT; 0.1 'HORIZONTAL-BLOCKER'; BOUNDS +0.2;
INTERFACE 0
0; REDEFINE COLOR 11
PLOT EDGES OVERLAY; RETURN
top-mirrors.inr !!TOP MIRRORS
!!Nov. 12, 2002
!!GENERATE TOP HORIZONTAL MIRRORS.
$CASE UPPER
!!PLRD
EDGE; POINTS Z 0, 0 0 1, -2.85 0 1, -2.85+(2.85-1.35)/2 -1.2
1, -(2.85-1.35)/2 -1.2 1
ROTATE Z 0 0 0; ROTATE X 23 0 0; ROTATE Y 120 0 0; SHIFT
-4.05 -1.65 -2.45+1
OBJECT; 0.1 'TOP.PLRD'; INTERFACE 1 0; REDEFINE COLOR 11
!!PRRD
EDGE; POINTS Z 0, 0 0 1, , (2.85-1.35)/2 -1.2 1, 2.85-(2.85-
1.35)/2 -1.2 1, 2.85 0 1
ROTATE Z 0 0 0; ROTATE X 23 0 0; ROTATE Y -120 0 0; SHIFT
4.05 -1.65 -2.45+1
OBJECT; 0.1 'TOP.PRRD'; INTERFACE 1 0; REDEFINE COLOR 11
!!SLRD
EDGE; POINTS Z 0, 0 0 1, 0 1.35 1, -3.3 1.35 1, -3.3 0 1
ROTATE Z -28 0 0; ROTATE X -46 0 0; ROTATE Y -13 0 0; SHIFT
-1.325 -4.7 -1.425+1
OBJECT; 0.1 'TOP.SLRD'; INTERFACE 1 0; REDEFINE COLOR 11
!!SRRD
EDGE; POINTS Z 0, 0 0 1, 3.3 0 1, 3.3 1.35 1, 0 1.35 1
ROTATE Z 28 0 0; ROTATE X -46 0 0; ROTATE Y 13 0 0; SHIFT
1.325 -4.7 -1.425+1
OBJECT; 0.1 'TOP.SRRD'; INTERFACE 1 0; REDEFINE COLOR 11
!!PLFV
EDGE; POINTS Z 0, 0 0 1, 0 -1.8 1, 3.625 -1.8 1, 3.625 0 1
ROTATE Z 0 0 0; R0TATE X 26 0 0; ROTATE Y 85 0 0; SHIFT
-2.65 -1.05 4.075+1
OBJECT; 0.1 'TOP.PLFV'; INTERFACE 1 0; REDEFINE COLOR 11
!!PRFV
EDGE; POINTS Z 0, 0 0 1, -3.625 0 1, -3.625 -1.8 1, 0 -1.8 1
ROTATE Z 0 0 0; ROTATE X 26 0 0; ROTATE Y -85 0 0; SHIFT
2.65 -1.05 4.075+1
OBJECT; 0.1 'TOP.PRFV'; INTERFACE 1 0; REDEFINE COLOR 11
!!SLFV
EDGE; POINTS Z 0, 0 0 1, 0 -1.61 1, .515 -3.02 1, 1.45 -2.77
1, 1.45 0 1
ROTATE Z -35 0 0; ROTATE X -30 0 0; ROTATE Y -175 0 0; SHIFT
-2.35 -1.025 4.7+1

-continued

OBJECT; 0.1 'TOP.SLFV'; INTERFACE 1 0; REDEFINE COLOR 11
!!SRFV
EDGE; POINTS Z 0, 0 0 1, -1.45 0 1, -1.45 -2.77 1, -.515
-3.02 1, 0 -1.61 1
ROTATE Z 35 0 0; ROTATE X -30 0 0; ROTATE Y 175 0 0; SHIFT
2.35 -1.025 4.7+1
OBJECT; 0.1 'TOP.SRFV'; INTERFACE 1 0; REDEFINE COLOR 11
!!LFP
EDGE; POINTS Z 0, 0 0 1, 0 -1.35 1, 1.3 -1.35 1, 1.95 0 1
ROTATE Z 0 0 0; ROTATE X -15 0 0; ROTATE Y 173 0 0; SHIFT
-.075 -1.025 4.5+1
!!OBJECT; 0.1 'TOP.LFP'; INTERFACE 1 0; REDEFINE COLOR 11
!!RFP
EDGE; POINTS Z 0, 0 0 1, -1.95 0 1, -1.3 -1.35 1, 0 -1.35 1
ROTATE Z 0 0 0; ROTATE X -18 0 0; ROTATE Y -173 0 0; SHIFT
.075 -1.025 4.5+1
OBJECT; 0.1 'TOP.RFP'; INTERFACE 1 0; REDEFINE COLOR 11
PLOT FACETS OVERLAY; RETURN
vertical-aperture.inr !!VERTICAL OPTICS ENGINE
!!Nov. 12, 2002
!!GENERATE OPTICS ENGINE (SPINNER, DETECTOR, ROUTING
MIRROR & COLLECTOR)
!!FOR VERTICAL SCANNER, TRACE RAYS.
$CASE UPPER
!!DEFINE IN NOMINAL ORIENTATION THEN MOVE INTO PLACE
AS A GROUP.
!!VERTICAL ROTATION AND TRANSLATION PARAMETERS.
XRV=0; YRV=0; ZRV=0 XV=0; YV=6.135; ZV=-5.205
!!COLLECTOR ORIGIN.
XC=0; YC=0; ZC=0
!!LASER ORIGIN AND AXIS THROUGH COLLECTOR DEFINES
INTERSECTION OF
!!LASER WITH COLLECTOR SURFACE.
XL=(XC); YL=(YC); ZL=(ZC); AL=0; BL=-COS[4]; CL=SIN[4]
!!SPINNER FACET
!!SFD=6.265 !!DISTANCE FROM LASER ORIGIN TO SPINNER
FACET CENTER FOR HORIZONTAL SCANNER.
SFD=6 !!DISTANCE FROM LASER ORIGIN TO SPINNER FACET
CENTER FOR VERTICAL SCANNER.
XF=(XC); YF=(YC) + (SFD*BL); ZF=(ZL) + (SFD*CL) !!NOMINAL
INTERSECTION OF FACET AND LASER.
!!SPINNER ORIGIN AND AXIS
HHS=.4; RS=.65; AS=0; BS=-SIN[4.75]; CS=COS[4.75]
XS=(XF); YS=(YF) - (RS*CS); ZS=(ZF) + (RS*BS)
!!SPINNER DEFINITION
DR1=(HHS) *TAN[-14]; DR2=(HHS) *TAN[-1.5]; DR3=(HHS) *TAN
[-16]; DR4=(HHS) *TAN[-3.5]
EDGE; POINTS (-RS-DR4) (-RS-DR1) - (HHS) 1; (RS+DR2) (-RS-
DR1) - (HHS) 1; (RS+DR2) (RS+DR3) - (HHS) 1; (-RS-DR4)
(RS+DR3) - (HHS) 1
EDGE; POINTS (-RS+DR4) (-RS+DR1) (HHS) 1; (RS-DR2)
(-RS+DR1) (HHS) 1; (RS-DR2) (RS-DR3) (HHS) 1; (-RS+DR4)
(RS-DR3) (HHS) 1
OBJECT; .1 .2 'SPINNER'; INTERFACE 1 0; REDEFINE COLOR 22
ROTATE X 4.75 0 0; ROTATE Y 0 0 0; ROTATE Z 0 0 0; SHIFT
(XS) (YS) (ZS)
ROTATE X (XRV) 0 0; ROTATE Y (YRV) 0 0; ROTATE Z (ZRV) 0 0;
SHIFT (XV) (YV) (ZV) !!MOVE FOR VERTICAL SCANNER.
!!DETECTOR
XD=(XC); YD=(YC) - 4.25; ZD=(ZC) - 1.58
EDGE; POINTS .059 .059 0 1; -.059 .059 0 1; -.059 -.059 0 1;
.059 -. 059 0 1
OBJECT; .1 'DETECTOR'; INTERFACE 0 0; REDEFINE COLOR 8
ROTATE X 0 0 0; ROTATE Y 0 0 0; ROTATE Z 0 0 0; SHIFT (XD)
(YD) (ZD)
ROTATE X (XRV) 0 0; ROTATE Y (YRV) 0 0; ROTATE Z (ZRV) 0 0;
SHIFT (XV) (YV) (ZV) !!MOVE FOR VERTICAL SCANNER.
!!ROUTING MIRROR
XRM=(XD); YRM=(YD); ZRM=(ZC) - 1.13; TILTI=90+ATAN[(ZL-
ZRM)/(YL-YRM)]; TILTRM=-180+(TILTI)/2
EDGE; POINTS .375 .2 0 1; -.375 .2 0 1; -.375 -.475 0 1,
.375 -.475 0 1
OBJECT; .1 'ROUTING-MIRROR'; INTERFACE 1 0; REDEFINE
COLOR 4
ROTATE X (TILTRM) 0 0; ROTATE Y 0 0 0; ROTATE Z 0 0 0; SHIFT
(XRM) (YRM) (ZRM)
ROTATE X (XRV) 0 0; ROTATE Y (YRV) 0 0; ROTATE Z (ZRV) 0 0;

-continued

```
SHIFT (XV) (YV) (ZV) !!MOVE FOR VERTICAL SCANNER.
!!LAYOUT
ID=SQRT((XL-XRM)^2+(YL-YRM)^2+(ZL-ZRM)^2)+(ZRM-ZD);
OD=18 XI=XL; YI=(YL) - (ID)*SIN[TILTI]; ZI=(ZL)+(ID)*COS
[TILTI] XO=XL; YO=(YL) + (OD*BL); ZO=(ZL) + (OD*CL)
EDGE; POINTS (XI) (YI) (ZI) 1; (XO) (YO) (ZO) 1; (XL) (YL)
(ZL) 1; (XRM) (YRM) (ZRM) 1; (XD) (YD) (ZD) 1
!!OBJECT; .1 'LAYOUT'; INTERFACE 0 0; REDEFINE COLOR 4
ROTATE X (XRV) 0 0; ROTATE Y (YRV) 0 0; ROTATE Z (ZRV) 0 0;
SHIFT (XV) (YV) (ZV) !!MOVE FOR VERTICAL SCANNER.
!!DEFINE MOVED LASER ORIGIN AND AXES.
!!MAKE THIS MORE GENERAL LATER.
XL=(XL+XV); YL=(YL+YV); ZL=(ZL+ZV)
!!DEFINE MOVED SPINNER ORIGIN AND AXES.
!!MAKE THIS MORE GENERAL LATER.
XS=(XS+XV) ; YS=(YS+YV); ZS=(ZS+ZV)
!!PLOT FACETS OVERLAY
!!PLOT EDGES OVERLAY
!!$GO quit
!!$GO jump
!!RUN COMPLETE ROTATION AND OUTPUT.
$ECHO NONE
$IO OUTPUT VERTICAL ONLY
$IO OUTPUT DELETE
$IO VECTOR REWIND
FANGLE=360; STEPS=4; NSTEPS=(FANGLE) * (STEPS)
$DO 1 (NSTEPS)
{
GROUP SPINNER
ANGLE=(1/STEPS); ROTATE (ANGLE) ABOUT (AS), (BS), (CS) (XS)
(YS) (ZS)
RAYSET Y (YL); (ZL) (XL); SOURCE DIRECTION (AL) (BL) (CL);
TRACE PLOT OVERLAY
GET; R=(?/STEPS)
$IO OUTPUT VERTICAL ONLY
$IO OUTPUT APPEND
$SCR 1
\CURR_OBJ \ \R.2 \ \FLUX.8 \ \OPL.8 \ \X_POS_B.8 \
\Y_POS_B.8 \ \Z_POS_B.8 \ \X_DIR_B.8 \ \Y_DIR_B.8 \
\Z_DIR_B.8 \
$IO OUTPUT CLOSE
}
$GO skip
jump
!!RUN PARTIAL ROTATIONS.
FANGLE=90; STEPS=4; NSTEPS=(FANGLE) * (STEPS); JANGLE=90-
(FANGLE)
GROUP SPINNER
ROTATE 0 ABOUT (AS), (BS), (CS) (XS) (YS) (ZS)
$DO 1 (NSTEPS)
{
GROUP SPINNER
ANGLE=(1/STEPS); ROTATE (ANGLE) ABOUT (AS), (BS), (CS) (XS)
(YS) (ZS)
RAYSET Y (YL); (ZL) (XL); SOURCE DIRECTION (AL) (BL) (CL);
TRACE PLOT OVERLAY
}
!!GO skip
GROUP SPINNER; ROTATE 00 ABOUT (AS), (BS), (CS) (XS) (YS)
(ZS)
GROUP SPINNER; ROTATE (JANGLE) ABOUT (AS), (BS), (CS) (XS)
(YS) (ZS)
$DO 1 (NSTEPS)
{
GROUP SPINNER
ANGLE=(1/STEPS); ROTATE (ANGLE) ABOUT (AS), (BS), (CS) (XS)
(YS) (ZS)
RAYSET Y (YL); (ZL) (XL); SOURCE DIRECTION (AL) (BL) (CL);
TRACE PLOT OVERLAY
}
!!$GO skip
GROUP SPINNER; ROTATE (JANGLE) ABOUT (AS), (BS), (CS) (XS)
(YS) (ZS)
$DO 1 (NSTEPS)
{
GROUP SPINNER
ANGLE=(1/STEPS); ROTATE (ANGLE) ABOUT (AS), (BS), (CS) (XS)
(YS) (ZS)
RAYSET Y (YL); (ZL) (XL); SOURCE DIRECTION (AL) (BL) (CL);
```

-continued

```
TRACE PLOT OVERLAY
}
GROUP SPINNER; ROTATE (JANGLE) ABOUT (AS), (BS), (CS) (XS)
(YS) (ZS)
$DO 1 (NSTEPS)
{
GROUP SPINNER
ANGLE=(1/STEPS); ROTATE (ANGLE) ABOUT (AS), (BS), (CS) (XS)
(YS) (ZS)
RAYSET Y (YL); (ZL) (XL); SOURCE DIRECTION (AL) (BL) (CL);
TRACE PLOT OVERLAY
}
skip
quit
!!$VIEW
RETURN
vertical optics engine.inr !!VERTICAL APERTURE
!!Nov. 12, 2002
!!GENERATE VERTICAL APERTURE AND BLOCKER.
$CASE UPPER
!!VERTICAL-APERTURE
EDGE; POINTS, 4 6.4 -3 1, -4 6.4 -3 1, -4 .05 -3-(6.4-
.05) *TAN[4] 1, 4 .05 -3-(6.4-.05) *TAN[4] 1
OBJECT; 0.1 'VERTICAL-APERTURE'; INTERFACE 0 0; REDEFINE
COLOR 2
!!VERTICAL BLOCKER
EDGE; POINTS, 5.75 7.125 -3+(7.125-6.4) *TAN[4] 1, -5.75
7.125 -3+(7.125-6.4) *TAN[4] 1, -5.75 -5 -3-(6.4+5) *TAN[4] 1,
5.75 -5 -3-(6.4+5) *TAN[4] 1
OBJECT; 0.1 'VERTICAL-BLOCKER'; BOUNDS +0.2;
INTERFACE 0 0; REDEFINE COLOR 11
PLOT EDGES OVERLAY; RETURN
```

What is claimed is:

1. An optical scanner comprising:

a scanner housing;

a first self-contained optics assembly including a first housing within the scanner housing including a horizontal aperture, wherein the first optics assembly generates first scan lines for scanning a bottom side, and further scanning an operator side, a leading side, and a trailing side of an item; and a second self-contained optics assembly including a second housing within the scanner housing including a substantially vertical aperture, wherein the second optics assembly generates second scan lines for scanning a customer side, and further scanning the leading side, the trailing side, and a top side of the item;

wherein the first and second self-contained optics assemblies include a plurality of primary pattern mirrors for directing first scanning light beams through the horizontal and vertical apertures to create first groups of the first and second scan lines; and a plurality of secondary pattern mirrors for reflecting second scanning light beams from the primary pattern mirrors through the horizontal and vertical apertures to create second groups of the first and second scan lines.

2. The scanner of claim 1, wherein the first self-contained optics assembly includes a first mirrored polygon spinner, and the second self-contained optics assembly includes a second mirrored polygon spinner.

3. The scanner of claim 2, wherein the first mirrored polygon spinner is located towards a customer side of the first self-contained optics assembly, and the second mirrored polygon spinner is located towards a bottom side of the second self-contained optics assembly.

4. The scanner of claim 1, wherein the first self-contained optics assembly includes a first mirror basket, and the second self-contained optics assembly includes a second mirror basket.

5. The scanner of claim 1, wherein the first and second optics assemblies are substantially bilaterally symmetrical about a centerline.

6. The scanner of claim 1, wherein the first self-contained optics assembly includes a first laser, and the second self-contained optics assembly includes a second laser.

7. The scanner of claim 1, wherein the first and second optics assemblies generate a total of fifty-six scan lines.

8. The scanner of claim 7, wherein the first self-contained optics assembly generates twenty-four scan lines, and the second self-contained optics assembly generates thirty-two scan lines.

9. The scanner of claim 1, wherein the first self-contained optics assembly includes a first detector, and the second self-contained optics assembly includes a second detector.

10. The scanner of claim 9, further comprising control circuitry in the scanner housing for obtaining bar code information from first and second electrical signals from the first and second detectors.

11. The scanner of claim 1, further comprising control circuitry in the scanner housing for obtaining bar code information from a first signal from the first self-contained optics assembly and a second signal from the second self-contained optics assembly.

12. The scanner of claim 1, wherein the first self-contained optics assembly comprises:
 a mirrored polygon spinner for directing a first set of the first scanning light beams to a first set of the primary pattern mirrors.

13. The scanner of claim 12, wherein the mirrored polygon spinner comprises facets of different angles which divide the first scan lines into pairs.

14. The scanner of claim 12, wherein the second group of the first scan lines scan the leading, trailing, customer, operator, and bottom sides of the item.

15. The scanner of claim 12, wherein the first group of the first scan lines scan the operator and bottom sides of the item.

16. The scanner of claim 12, wherein the first self-contained optics assembly comprises twelve primary pattern mirrors and six secondary pattern mirrors.

17. The scanner of claim 1, wherein the second self-contained optics assembly comprises:
 a mirrored polygon spinner for directing a second set of the first scanning light beams to a second set of the primary pattern mirrors.

18. The scanner of claim 17, wherein the mirrored polygon spinner comprises facets of different angles which divide the second scan lines into pairs.

19. The scanner of claim 17, wherein the second group of the second scan lines scan the leading, trailing, customer, top, and bottom sides of the item.

20. The scanner of claim 17, wherein the first group of the second scan lines scan the top and customer sides of the item.

21. The scanner of claim 17, wherein the second self-contained optics assembly comprises sixteen primary pattern mirrors and six secondary pattern mirrors.

22. The scanner of claim 1, further comprising control circuitry in one of the first and second self-contained optics assemblies for obtaining bar code information from a first signal from the first self-contained optics assembly and a second signal from the second self-contained optics assembly.

23. The scanner of claim 1, wherein the first self-contained optics assembly substantially omnidirectionally scans the bottom side of the item.

24. The scanner of claim 1, wherein the second self-contained optics assembly substantially omnidirectionally scans the customer side of the item.

25. The scanner of claim 1, wherein at least one of the first and second self-contained optics assemblies additionally generate third scan lines for scanning an intermediate side of the item.

26. The scanner of claim 1, wherein the intermediate side comprises an intermediate bottom customer side.

27. The scanner of claim 1, wherein the first self-contained optics assembly substantially omnidirectionally scans the bottom side of the item, wherein the second self-contained optics assembly substantially omnidirectionally scans the customer side of the item, and wherein the first and second self-contained optics assemblies are capable of scanning truncated bar code labels.

28. An optical scanner comprising:
 a scanner housing;
 a first optics assembly within the scanner housing including a horizontal aperture, wherein the first optics assembly generates first scan lines for scanning a bottom side, an operator side, a leading side, and a trailing side of an item; and
 a second optics assembly including a second housing within the scanner housing including a substantially vertical aperture, wherein the second optics assembly generates second scan lines for scanning a customer side, the leading side, the trailing side, and a top side of the item;
 wherein the first and second optics assemblies include
  a plurality of primary pattern mirrors for directing first scanning light beams through the horizontal and vertical apertures to create first groups of the first and second scan lines; and
  a plurality of secondary pattern mirrors for reflecting second scanning light beams from the primary pattern mirrors through the horizontal and vertical apertures to create second groups of the first and second scan lines;
 wherein at least one of the first and second optics assemblies additionally generates third scan lines for scanning an intermediate side of the item.

29. The scanner of claim 28, wherein the intermediate side comprises an intermediate bottom customer side.

30. The scanner of claim 28, wherein the first optics assembly substantially omnidirectionally scans the bottom side of the item.

31. The scanner of claim 28, wherein the second optics assembly substantially omnidirectionally scans the customer side of the item.

32. The scanner of claim 28, wherein the first self-contained optics assembly substantially omnidirectionally scans the bottom side of the item, wherein the second self-contained optics assembly substantially omnidirectionally scans the customer side of the item, and wherein the first and second self-contained optics assemblies are capable of scanning truncated bar code labels.

33. An optical scanner comprising:
 a scanner housing;
 a first optics assembly within the scanner housing including a horizontal aperture; and
 a second optics assembly including a second housing within the scanner housing including a substantially vertical aperture;

wherein the first and second optics assemblies include
a plurality of primary pattern mirrors for directing first scanning light beams through the horizontal and vertical apertures to create first groups of the first and second scan lines; and
a plurality of secondary pattern mirrors for reflecting second scanning light beams from the primary pattern mirrors through the horizontal and vertical apertures to create second groups of the first and second scan lines;

wherein the first and second optics assemblies are capable of scanning six sides of an item; and wherein at least one of the first and second optics assemblies additionally generates third scan lines for scanning an intermediate side of the item.

34. The scanner of claim 33, wherein the first self-contained optics assembly substantially omnidirectionally scans a bottom side of the item, wherein the second self-contained optics assembly substantially omnidirectionally scans a customer side of the item, and wherein the first and second self-contained optics assemblies are capable of scanning truncated bar code labels.

35. The scanner of claim 33, wherein the intermediate side comprises a side between a customer side and a bottom side of the item.

36. An optical scanner comprising:

a scanner housing;

a first self-contained optics assembly including a first housing within the scanner housing including a horizontal aperture, wherein the first optics assembly generates first scan lines for scanning a bottom side, and further scanning an operator side, a leading side, and a trailing side of an item;

wherein the first self-contained optics assembly includes
a mirrored polygon spinner;
a plurality of primary pattern mirrors for directing scanning light beams from the mirrored polygon spinner;
wherein the primary pattern mirrors direct first scanning light beams through the horizontal aperture to create a first group of the first scan lines; and
a plurality of secondary pattern mirrors for reflecting second scanning light beams from the primary pattern mirrors through the horizontal aperture to create a second group of the first scan lines; and a second self-contained optics assembly including a second housing within the scanner housing including a substantially vertical aperture, wherein the second optics assembly generates second scan lines for scanning a customer side, and further scanning the leading side, the trailing side, and a top side of the item.

37. The scanner of claim 36, wherein the mirrored polygon spinner comprises facets of different angles which divide the first scan lines into pairs.

38. The scanner of claim 36, wherein the second group of the first scan lines scan the leading, trailing, customer, operator, and bottom sides of the item.

39. The scanner of claim 36, wherein the first group of the first scan lines scan the operator and bottom sides of the item.

40. The scanner of claim 36, wherein the first self-contained optics assembly comprises twelve primary pattern mirrors and six secondary pattern mirrors.

41. An optical scanner comprising:

a scanner housing;

a first self-contained optics assembly including a first housing within the scanner housing including a horizontal aperture, wherein the first optics assembly generates first scan lines for scanning a bottom side, and further scanning an operator side, a leading side, and a trailing side of an item; and a second self-contained optics assembly including a second housing within the scanner housing including a substantially vertical aperture, wherein the second optics assembly generates second scan lines for scanning a customer side, and further scanning the leading side, the trailing side, and a top side of the item;

wherein the second self-contained optics assembly includes
a mirrored polygon spinner;
a plurality of primary pattern mirrors for directing scanning light beams from the mirrored polygon spinner;
wherein the primary pattern mirrors direct first scanning light beams through the substantially vertical aperture to create a first group of the second scan lines; and
a plurality of secondary pattern mirrors for reflecting second scanning light beams from the primary pattern mirrors through the substantially vertical aperture to create a second group of the second scan lines.

42. The scanner of claim 41, wherein the mirrored polygon spinner comprises facets of different angles which divide the second scan lines into pairs.

43. The scanner of claim 41, wherein the second group of the second scan lines scan the leading, trailing, customer, top, and bottom sides of the item.

44. The scanner of claim 41, wherein the first group of the second scan lines scan the top and customer sides of the item.

45. The scanner of claim 41, wherein the second self-contained optics assembly comprises sixteen primary pattern mirrors and six secondary pattern mirrors.

* * * * *